March 14, 1961 T. NAGEL 2,974,886
APPARATUS FOR THE SHATTERING OF SOLID PARTICLES
Filed Jan. 8, 1959 4 Sheets-Sheet 2
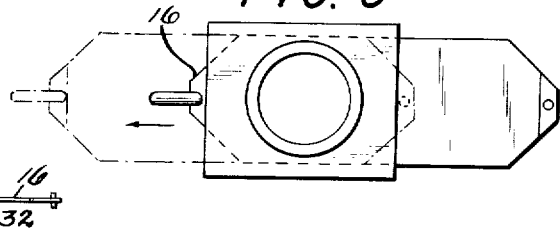
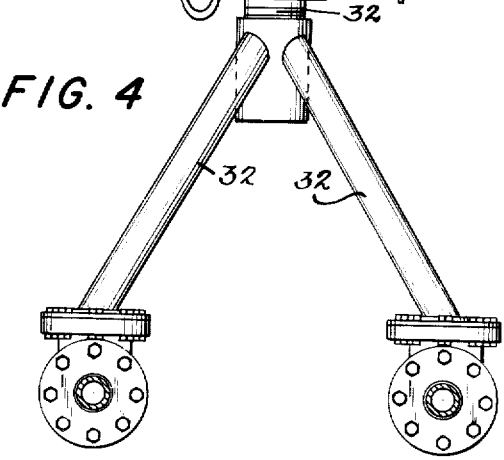
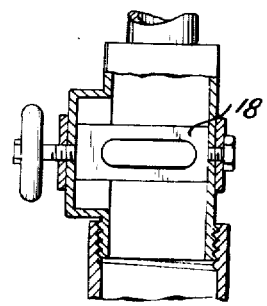
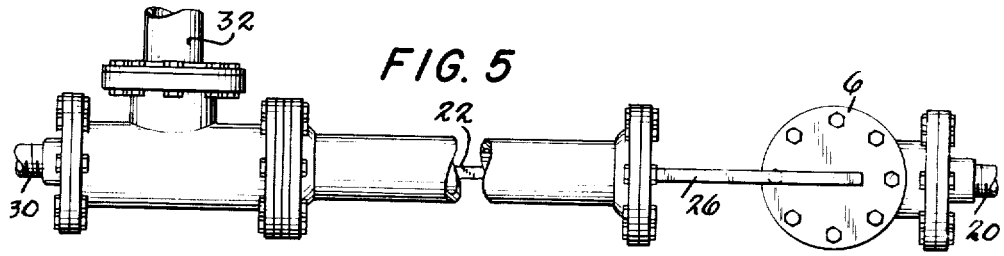
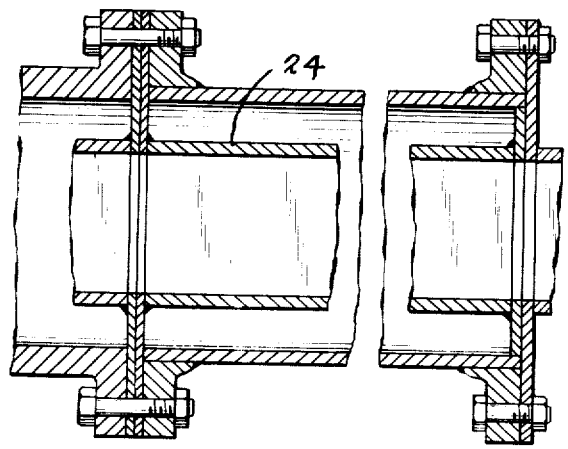
INVENTOR.
THEODORE NAGEL
BY
*James G. Bethell*
ATTORNEY.

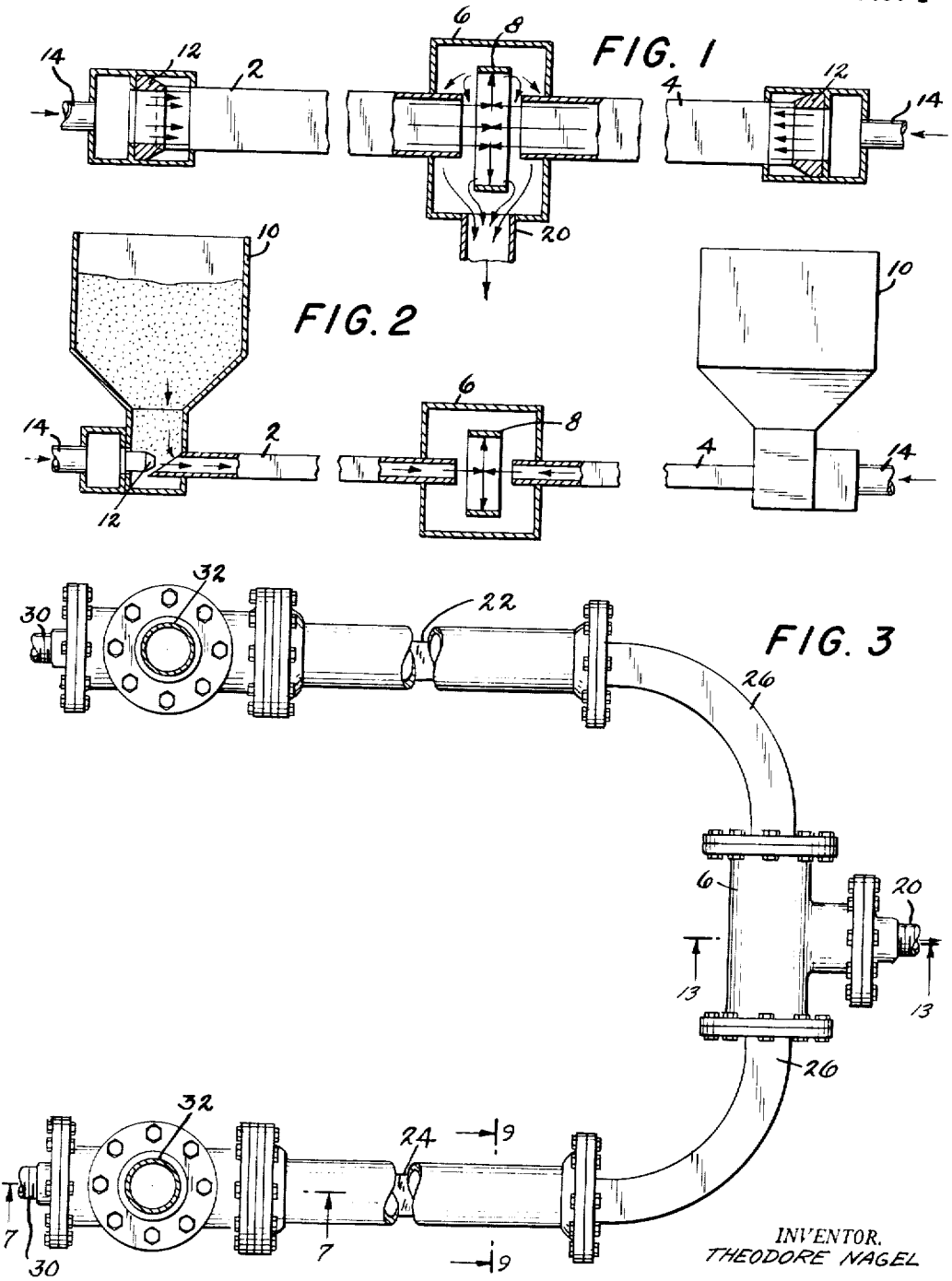

INVENTOR.
THEODORE NAGEL
BY
*James G. Bethell*
ATTORNEY.

March 14, 1961 T. NAGEL 2,974,886
APPARATUS FOR THE SHATTERING OF SOLID PARTICLES
Filed Jan. 8, 1959 4 Sheets-Sheet 4
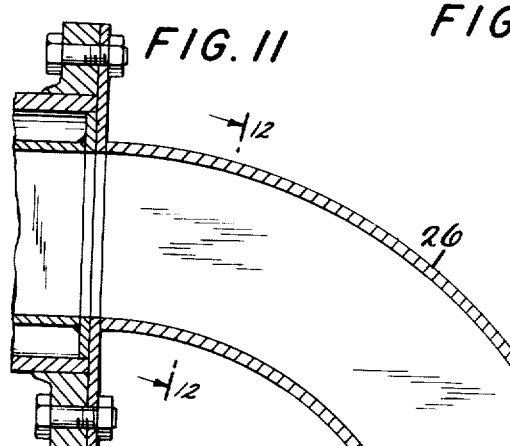
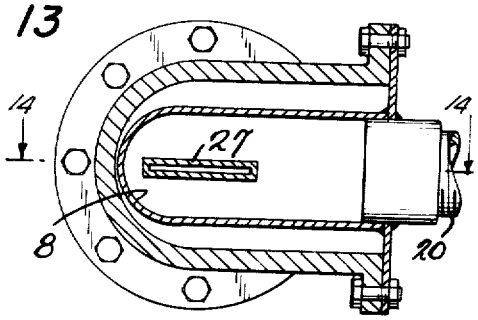
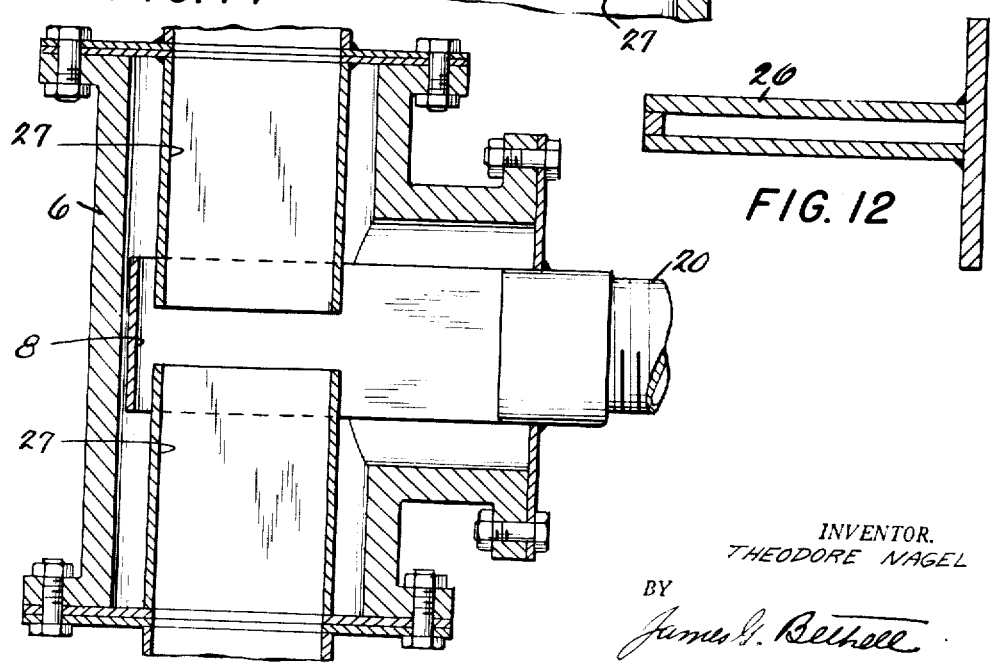
INVENTOR.
THEODORE NAGEL
BY
James G. Bethell
ATTORNEY.

United States Patent Office 2,974,886
Patented Mar. 14, 1961

2,974,886
APPARATUS FOR THE SHATTERING OF SOLID PARTICLES

Theodore Nagel, 76 Remsen St., Brooklyn, N.Y.

Filed Jan. 8, 1959, Ser. No. 785,681

4 Claims. (Cl. 241—39)

This invention is directed to apparatus for the shattering of solid particles by causing two counterflowing streams of the solids to impact or collide with each other at extremely high velocities.

More specifically, my invention provides an apparatus wherein two streams of solid particles are conveyed by two streams of a gaseous material, such as compressed air, gas, or steam, for example, flowing in opposed directions through conduits, the solids being accelerated by the gaseous streams flowing through the conduits until, exhausting from the conduits, the two counterflowing streams of solids impact or collide with each other at approximately sonic velocity.

Still more specifically, my invention provides an apparatus wherein fluidized solids, viz., particles of solids entrained in air or a slurry of solids and water, are dropped by gravity from a hopper or hoppers upon two counterflowing, flat, pressurized gaseous streams and are carried or conveyed by the pressurized gaseous streams into and through two axially aligned conduits, where they are accelerated until, at the exhaust ends of the conduits, the solids in each stream have attained a velocity of as high as 650 feet per second. The shattering forces at such high impact velocity are extremely high, as will be appreciated, and I have found, for example, that solid particles which initially will pass through a quarter-inch screen will be reduced or shattered to sub-screen micron sizes.

In another embodiment of my invention the two streams of solid particles counterflow through two horizontally disposed, laterally displaced accelerating conduits. The solid particles, which are fed into the apparatus by gravity, are not classified but merely sized to pass a certain-size screen so that, while the particles will all pass through this screen, they may vary in size over a considerable range. The conduits near their exhaust ends are curved toward each other so that, as the particles pass through the curved portions of the conduits at the high velocity attained in my apparatus, the coarser particles of the charge in each conduit will be thrown outwardly, and the coarse particles discharging from one conduit will impact coarse particles discharging from the opposed conduit, resulting in maximum shattering, instead of coarse particles impacting relatively fine particles, which would result in shattering of the fine particles with little or no shattering of the relatively coarse particles. Of course, where the particles of solids have been classified or screened to approximately one size, the conduits may be straight and disposed in axial alignment.

In the accompanying drawings,

Fig. 1 is a plan view, partially in section, of an embodiment of my invention wherein the accelerating conduits are straight and axially aligned;

Fig. 2 is an elevational view, partially in section, of the apparatus of Fig. 1;

Fig. 3 is a plan view of another embodiment of my invention wherein the conduits are disposed in laterally displaced relation and are curved toward each other at their exhaust ends;

Fig. 4 is an elevational view illustrating a suitable feeding or charging arrangement employed in connection with the curved conduit arrangement illustrated in Fig. 3;

Fig. 4a is a sectional, elevational view of a plug-valve arrangement to be used when the feed is in the form of a slurry, this valve being usable with the apparatus of both Figs. 1 and 3;

Fig. 5 is a fragmentary side view of Fig. 3;

Fig. 6 is a plan view of a slide valve usable with the embodiments of Figs. 1 and 3 when the feed is dry instead of a slurry;

Fig. 10 is a section taken on the line 10—10 of Fig. 9;

Fig. 11 is a sectional view of the curved portion of one of the conduits of Fig. 3;

Fig. 12 is a section taken on the line 12—12 of Fig. 11;

Fig. 13 is a section taken on the line 13—13 of Fig. 3; and

Fig. 14 is a section taken on the line 14—14 of Fig. 13.

Figure 7:
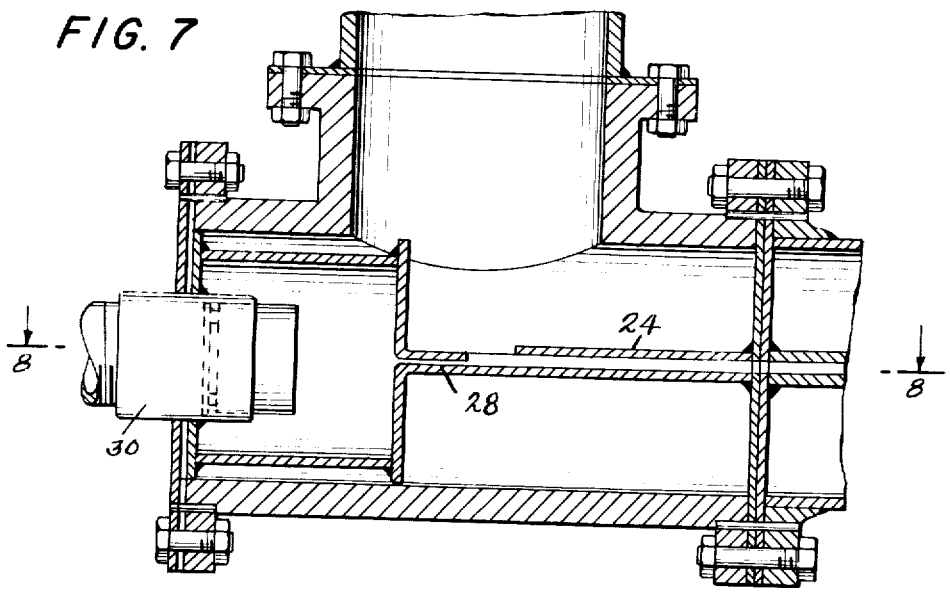
Fig. 7 is a section, on an enlarged scale, taken on the line 7—7 of Fig. 3.

Referring to the drawings in detail and, first of all, to the embodiment of my invention illustrated in Figs. 1 and 2 in particular, 2 and 4 designate two horizontally disposed, axially aligned accelerating conduits. The two conduits terminate short of each other within a shattering chamber 6. Within this chamber I provide a fixed annular target 8 surrounding the space between the adjacent exhaust ends of the conduits. Each accelerating conduit at its feed end is extended into the lower part of a feed hopper 10.

Axially aligned with the conduits 2 and 4 at the feed or charging end of the conduits are nozzles 12 for the pressurized gaseous conveying and accelerating streams, one nozzle for each conduit. The pressurized gaseous supply lines for these nozzles are designated 14.

Near the bottom of each hopper 10 I provide a simple valve arrangement for controlling the flow of the feed or charge from the hopper onto the gaseous conveying and accelerating stream. I preferably employ a slide valve, such as shown at 16 in Fig. 6, when the feed is fluidized solids, viz., dry solids and entrapped air, and a plug valve, such as shown at 18 in Fig. 4a, when the feed is a slurry, viz., solid particles and a liquid, such as water, for example.

As will be seen from Figs. 1 and 2, the accelerating conduits 2 and 4 as well as the nozzles 12 are rectangular in cross-section. It has been pointed out that the conduits and nozzles are in axial alignment, but it is to be noted that, in addition, the conduits and nozzles are symmetrically disposed relatively to each other, so that the pressurized gaseous conveying and accelerating streams discharging from the nozzles flow in the form of flat, ribbon-like streams, with their wide faces lying in a horizontal plane, into similarly shaped conduits symmetrically disposed relatively thereto. Inasmuch as the gaseous stream from each of the nozzles 12 is flowing horizontally, and inasmuch as the particles from the hoppers 10 are gravity-fed perpendicularly to these streams, not only do I provide the maximum area of gaseous conveyor stream upon which the solids fall, but I provide for the maximum feed, as compared with, for example, allowing the feed particles to fall upon a gaseous stream issuing from a circular nozzle of equal volume. By employing flattened (rectangular) gaseous conveyor streams and similarly shaped and symmetrically disposed accelerating conduits, the feed capacity of the apparatus may be increased in excess of three times by replacing a conventional circular orifice with an equal area of a flat, rectangularly shaped orifice having a perimeter in excess of three times the perimeter of the displaced circular orifice, thereby producing more than two pounds of sub-atmospheric pressure suction in the surrounding solids feed zone.

On entering the conduits the solids receive the highest rate of acceleration, this rate of acceleration continuously decreasing with distance of flow of the solids through the conduits. The relation between the accelerated velocity of the solids and the velocity of the gaseous conveyor streams, which we shall assume is 650 feet per second, for example, varies with time, viz., with length of conduit, and approximates the following:

| Conduit Length, ft. | Solids Velocity, ft./sec. | Percent Gas Velocity |
| --- | --- | --- |
| 5 | 215 | 33 |
| 10 | 390 | 60 |
| 15 | 485 | 75 |
| 20 | 535 | 82.5 |
| 25 | 570 | 87.5 |
| 30 | 585 | 90 |

It will be appreciated that the length of conduit (time factor) will depend upon the type of solids to be shattered and the desired fineness of the finished product. For example, in shattering coal particles, conduits five feet in length may be entirely satisfactory, whereas if the solids to be shattered were limestone, for example, the conduits would have to be longer, even up to thirty feet in length, to obtain the necessary velocity for the desired shattering action.

It will be appreciated from the foregoing that the two counterflowing streams of solid particles impact each other within the shattering chamber at tremendously high velocities, approximately twice the velocity tabulated above for each stream; the impacted particles being further shattered by impacting the fixed annular target 8.

The fluidized stream of shattered particles flows from the shattering chamber 6 through discharge outlet 20.

My apparatus is simple in construction and economical in operation inasmuch as there are no moving parts involved, the fluidized solids or the slurry, as the case may be, simply being fed upon the pressurized gaseous conveying streams, which accelerate the solids. I have found that one hundred pounds per square inch is ample service pressure for producing the gaseous conveying and accelerating streams.

Figure 8:
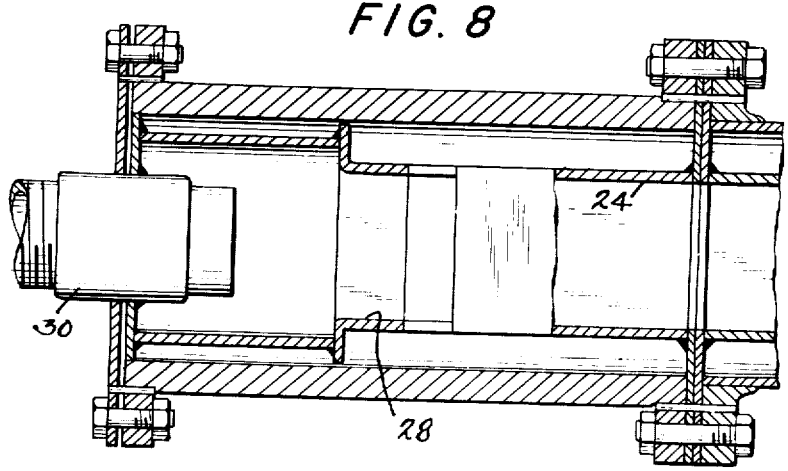
Fig. 8 is a section taken on the line 8—8 of Fig. 7.
Figure 9:
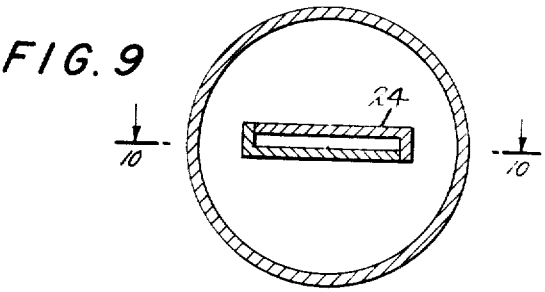
Fig. 9 is a section taken on the line 9—9 of Fig. 3.

In the embodiment of my invention illustrated in Figs. 3 to 14, inclusive, the conduits 22 and 24 for accelerating the solids are of the same cross-section as the conduits 2 and 4. In this embodiment, however, the conduits extend parallel to each other, in laterally displaced relation, and toward their discharge ends are curved, as shown at 26, these portions curving toward each other so that their discharge ends 27 (Fig. 14), which extend into and terminate in spaced relation within the shattering chamber 6, are axially aligned. As in the embodiment of Figs. 1 and 2, a stationary target 8 is provided within the shattering chamber. The discharge from the shattering chamber is shown at 20.

At the feed end of each conduit I provide a nozzle 28, of the same cross-section as the nozzles 12 of Fig. 1, for the gaseous conveying and accelerating streams. The fluid for these streams, which may be compressed air, gas, or steam, for example, is supplied through lines 30 at a pressure of one hundred pounds per square inch, for example.

It will be appreciated that the accelerating conduits 22 and 24 and the nozzles 28 in this embodiment of my invention have the same shape, viz., rectangular, as the corresponding elements of Figs. 1 and 2.

By reason of the fact that the intake ends of the accelerating conduits in this second embodiment of the invention are at the same end of the apparatus, I may employ a single hopper instead of the two hoppers of Figs. 1 and 2. This hopper, which for clarity of illustration has not been shown in the drawings, may be a duplicate of one of the hoppers 10 and is mounted upon a coupling 32, equipped with two diverging legs 33, one terminating just above the intake end of the accelerating conduit 22, and the other terminating just above the intake end of the other accelerating conduit 24.

In this embodiment of the invention, as in Figs. 1 and 2, the gaseous conveying and accelerating streams for the solids are rectangular in cross-section, and the accelerating conduits, which are in axial alignment with these streams, are rectangular in cross-section and symmetrically disposed relatively to the conveying and accelerating streams. Here again, the wide faces of the gaseous streams lie in a horizontal plane, so that the solids flowing from the feed hopper will be picked up by a relatively large, flat surface as compared with the narrow surface which would be uppermost if the streams were turned 180°, and as compared with a convex surface such as would be exposed if the gaseous streams were circular in cross-section and of the same area as the rectangular streams.

In the apparatus of this embodiment of the invention it will be apparent that the particles of solids are accelerated to high velocity in their passage through the accelerating conduits, as explained in connection with Fig. 1, so as to impact each other at tremendously high velocities. By curving the conduits as described, the larger particles of the feed are thrown outwardly in passing through these curved areas, so that large particles impact each other rather than merely impacting smaller particles. This promotes more thorough and uniform shattering of the feed, the particles of which are not classified but merely screened.

From the foregoing it will be seen that I have provided an apparatus for shattering solid particles which is simple in construction, economical in operation, devoid of mechanically moving parts, and extremely efficient in operation.

It will be seen also that, by employing the type of gaseous conveying and accelerating streams and the accelerating conduits above described, the solids are accelerated so as to exhaust at extremely high velocities, the two opposed streams impacting or colliding with tremendous force.

My apparatus is adapted for shattering any of the materials which conventionally are reduced by compartment grinding mills.

It is to be understood that changes may be made in the details of construction and arrangement of parts hereinabove described within the purview of my invention.

What I claim is:

1. Apparatus for shattering particles of solid materials, said apparatus comprising, in combination, a shattering chamber; a pair of horizontally disposed, elongated accelerating conduits for the charge of particles, said conduits being axially aligned and extending in opposed directions into said chamber and terminating in spaced relation therein, whereby particles discharging from one conduit will meet and impact the particles discharging from the other conduit; a nozzle adjacent the feed end of each of said conduits and axially aligned with the conduits for supplying a flat gaseous stream under pressure to each of said conduits, said nozzles and conduits being rectangular in cross-section, with their wide faces lying in a horizontal plane; and gravity means for depositing the particles upon the wide face of each of said gaseous streams for the conveyance of the particles to and through said conduits, said nozzles and conduits being so relatively proportioned that the particles as they are being conveyed through the conduits by the said gaseous streams are accelerated sufficiently to be discharged from each conduit at a velocity of not substantially less than 35% of the discharge velocity of the gaseous conveying streams.

2. Apparatus for shattering particles of solid materials, said apparatus comprising, in combination, a shattering chamber; a pair of accelerating conduits for the charge of particles, said conduits terminating in spaced relation within said shattering chamber, said conduits being of rectangular cross-section and extending in axial alignment in opposed directions, whereby particles discharging from one conduit will meet and impact the particles discharging from the other conduit; a nozzle adjacent the feed end of each of said conduits for supplying a flat gaseous stream under pressure to each of said conduits, said nozzles being rectangular in cross-section and symmetrically disposed in alignment with said conduits, the wide faces of the conduits and of the said nozzles lying in horizontal planes; and means for gravity-feeding the particles upon the wide face of each of said gaseous streams for the conveyance of the particles to and through said conduits, the cross-sectional area of each conduit ranging from five to seven times the cross-sectional area of each of said nozzles, whereby the particles are carried through said conduits at an accelerated velocity and are discharged therefrom at a velocity of between 35% to 90% of the discharge velocity of the gaseous stream.

3. Apparatus for shattering particles of solid materials, said apparatus comprising, in combination, a shattering chamber; a pair of horizontally disposed, elongated accelerating conduits for the charge of particles, said conduits being axially aligned and extending in opposed directions into said chamber and terminating in spaced relation therein, whereby particles discharging from one conduit will meet and impact the particles discharging from the other conduit; a fixed annular target within said chamber about the space between the terminal ends of said conduits; a nozzle adjacent the feed end of each of said conduits and axially aligned with the conduits for supplying a flat gaseous stream under pressure to each of said conduits, said nozzles and conduits being rectangular in cross-section, with their wide faces lying in a horizontal plane; and means for gravity-feeding the particles upon the wide face of each of said gaseous streams for the conveyance of the particles to and through said conduits, said nozzles and conduits being so relatively proportioned that the particles as they are being conveyed through the conduits are accelerated sufficiently to discharge from each conduit at a velocity of not substantially less than 35% of the discharge velocity of the gaseous conveying streams.

4. Apparatus for shattering particles of solid materials, said apparatus comprising, in combination, a shattering chamber; a pair of accelerating conduits disposed in laterally displaced relation parallel to each other, the conduits being curved intermediate their ends to bring the discharge end of one conduit into axial alignment with the corresponding end of the other conduit, the said axially aligned portions of the conduits terminating in spaced relation within said shattering chamber; a nozzle adjacent the feed end of each conduit for supplying a flat gaseous stream under pressure to each of said conduits, said nozzles and conduits being rectangular in cross-section and symmetrically disposed in axial alignment, with their wide faces lying in a horizontal plane; and a hopper disposed above the nozzles and conduits for gravity-feeding the particles upon the flat faces of the two gaseous conveying streams supplied by the nozzles, the length of said conduits and the cross-sectional area of the conduits relative to the cross-sectional area of the nozzles being such that the particles in each stream will impact each other within the shattering chamber at a velocity of not substantially less than 75% of the discharge velocity of the gaseous conveying and accelerating streams.

References Cited in the file of this patent
UNITED STATES PATENTS

| | | |
|---|---|---|
| 2,494,153 | Andrews et al. | Jan. 10, 1950 |
| 2,674,210 | Holub et al. | Apr. 6, 1954 |
| 2,846,150 | Work | Aug. 5, 1958 |